United States Patent [19]

Standiford

[11] 4,329,198
[45] May 11, 1982

[54] APPARATUS FOR FORCED CIRCULATION EVAPORATION

[76] Inventor: Ferris C. Standiford, 2713 S. North Bluff Rd., Greenbank, Wash. 98253

[21] Appl. No.: 196,572

[22] Filed: Oct. 14, 1980

Related U.S. Application Data

[63] Continuation-in-part of Ser. No. 612,736, Sep. 12, 1975, abandoned.

[51] Int. Cl.³ .............................................. B01D 1/12
[52] U.S. Cl. .................................. 159/6 R; 159/6 W; 159/13 A
[58] Field of Search .................. 159/5, 6 B, 6 W, 14, 159/13 R, 13 A, 45, 2 R, 49; 203/89, 88, 96; 202/236, 238, 237, 205

[56] References Cited

U.S. PATENT DOCUMENTS

| | | | |
|---|---|---|---|
| 3,273,631 | 9/1966 | Neuman | 159/6 R |
| 3,303,870 | 2/1967 | Newman | 159/45 |
| 3,362,458 | 1/1968 | Hopper | 159/45 |
| 3,717,554 | 2/1973 | Ruthrof | 202/238 |

*Primary Examiner*—Hiram Bernstein
*Attorney, Agent, or Firm*—Sidney W. Russell

[57] ABSTRACT

A forced circulation evaporator and method of use is disclosed that make use of a rotating impeller to both circulate liquid past the heating surface of the evaporator and to effect separation of liquid from vapor. A plurality of passage tubes acts as a generator of a liquid-vapor mixture. The impeller provides centrifugal force vectors to propel the liquid entity against the side wall of the separation zone to thereby leave the vapor to egress from the separation zone at a point near the axis of said impeller. Thus, the centrifugal force acts upon the varying densities of liquid versus vapor to cause separation more rapidly than under the mere influence of gravity.

8 Claims, 10 Drawing Figures

APPARATUS FOR FORCED CIRCULATION EVAPORATION

CLOSELY RELATED APPLICATIONS

This application is a continuation-in-part application of my copending prior application Ser. No. 612,736, filed Sept. 12, 1975 now abandoned on all the teachings of which are herein incorporated by reference thereto.

BACKGROUND OF THE INVENTION AND PRIOR ART

Forced circulation evaporators are widely used in industry, primarily for handling the more difficult evaporation duties. Examples are crystallizing services, where positive circulation is needed to keep the crystals in suspension; handling fouling liquids, which must be circulated past the heating surface at high velocity to prevent deposition of foulants; handling viscous liquids, which exhibit very poor heat transfer characteristics unless circulation past the heating surface is forced; and handling highly corrosive liquids, where the better heat transfer attainable with forced circulation permits a substantial reduction in heat transfer area of expensive alloys. Probably the earliest forced circulation evaporator was the propeller calandria, in which short vertical heat transfer tubes were arranged in circular tubesheets having a large diameter central downtake tube. A propeller rotating in this tube recirculated liquid down through the downtake and up through the heat transfer tubes to increase tube velocities and hence heat transfer performance, and also to help keep crystals in suspension. This type evaporator is still in widespread use, primarily for crystallizing common salt from brines. Most present-day forced circulation evaporators follow the teachings of Sadtler (U.S. Pat. No. 1,246,939, Nov. 20, 1917) and employ a conventional external pump to recirculate the liquid past the heating surface. The most common modern version is shown in FIG. 1. Liquid to be concentrated is circulated by the pump through a shell-and-tube heat exchanger, where it is superheated slightly (usually about 5° to 15° F.). The liquid is then discharged to a flash chamber or vapor head where vapor is flashed off and the remaining liquid, plus makeup feed, is returned to the pump for recirculation to the heater. This is the general operating cycle I employ except that I combine the duties of pump and vapor head in a single device.

Another version of forced circulation evaporator that bears some resemblance to mine is the wiped film evaporator first disclosed by D'Yarmett U.S. Pat. No. 1,870,445, Aug. 9, 1932). In this type, an impeller is used both to circulate liquid past the heating surface and to effect vapor-liquid separation, as does mine. However, the heating surface in these evaporators is the shell housing the impeller. The heating surface is then simply a large diameter cylindrical or tapered tube and it is impossible to provide substantial amounts of heating surface area in a reasonable size evaporator. Further, since the tube is heated from the outside, usually by steam, it is subjected to a collapsing pressure that necessitates use of a thick wall for the large diameter tube. The thermal resistance of this wall makes it most difficult to achieve high heat transfer performance.

OBJECTS OF THE INVENTION

A primary objective of the invention is to reduce the vessel volume required for separation of liquid from the vapor evolved in the evaporator.

A further objective of the invention is to combine the functions of circulating pump and vapor-liquid separation in one piece of equipment.

An additional objective is to eliminate the net positive suction head usually required by the circulating pump and thereby reduce the total height of the evaporator.

Another objective of the invention is to reduce the power required to circulate liquid through the evaporator, by reducing the head losses through the circulating system.

A further objective of the invention is to reduce both the capital and operating costs of forced-circulation evaporators.

An additional objective of the invention is to accomplish efficient separation of liquid from evolved vapor when the solution being concentrated has tendencies to foam.

SUMMARY OF THE INVENTION

The function and utility of my invention is best illustrated by its use with the heating element section of a conventional forced-circulation evaporator. The heating element comprises a nest of vertical tubes housed in a cylindrical steam heated shell, with the liquor flowing up through the tubes in a single pass (although multiple pass operation is also possible). My combination pump/vapor-liquid separator is mounted directly on top of the upper tube sheet of such a heating element, is coaxial therewith, and is of approximately the same diameter as the heating element. Liquid and vapor issuing from the tubes meets a rotating impeller, which throws the liquid to the cylindrical or tapered wall of the shell surrounding the impeller. Rotational speed is such as to cause the liquid to form a ring on the wall, leaving the space near the axis of the impeller free for vapor escape, said vapor leaving the device from an opening above and coaxial with the impeller. Residual liquid after vapor removal travels up the wall and overflows the top to recirculate to the inlet to the tubes. Simple overflow from the top of the impeller housing may in some cases provide sufficient head to create the desired velocity through the tubes. In other cases, the top of the impeller housing may contain a volute to convert rotational velocity of the liquid into additional liquid for enhanced circulation.

One embodiment of this invention resides in a forced circulation evaporator apparatus for removing as vapor part of a liquid contained in a feed stream charged to said apparatus which comprises an elongated vessel having an upper, imperforate intermediate and lower portion thereof possessing (i) a vapor outlet in said upper portion; (ii) a liquid outlet in said intermediate portion; and (iii) a hot gaseous inlet and a liquid phase feed inlet in said lower portion; a plurality of stationary heat transfer passage conduits situated in said lower portion of said vessel and substantially parallel to the longitudinal axis of said vessel wherein said plurality of heat transfer passage conduits initiate in the lower portion of said vessel and terminate in the intermediate portion of said vessel for passage of a vapor phase-liquid phase admixture therethrough, said admixture being heated by indirect heat exchange with a hot gaseous stream entered in said hot gaseous inlet situated in said lower portion of said vessel; an impeller situated within said intermediate portion of said vessel, said impeller possessing a shaft situated substantially parallel to said plurality of heat transfer passage conduits, a plate situated above the point at which said heat transfer conduits terminate and at least one blade attached to either or both of said shaft and said plate; and a movement means for turning said impeller to form a conical-shaped liquid phase along the interior of the walls of said intermediate portion of said vessel to effect discharge of said liquid phase through said outlet opening in the uppermost portion of said intermediate zone, said outlet opening being situated above said impeller blade and plate and wherein said impeller movement causes said vapor in said vapor phase-liquid phase admixture to rise above the surface of said liquid phase and exit said forced circulation evaporator apparatus through said vapor outlet situated in said upper portion of said vessel.

Another embodiment of this invention resides in a vapor-liquid separating apparatus for removing as vapor part of a liquid contained in a feed stream charged to said apparatus which comprises an elongated vessel having an upper section containing a vapor phase outlet means, an inverted conical intermediate section containing a liquid outlet means and an impeller means and a lower section containing a liquid phase inlet means, a hot gaseous inlet means and a plurality of heat transfer passage conduits, wherein said conduits initiate in said lower section and terminate in said inverted conical intermediate section below said impeller and wherein both said impeller and said plurality of heat transfer passage conduit tubes are disposed substantially parallel to the longitudinal axis of said elongated vessel, wherein a vapor phase-liquid phase admixture is passed from said lower section to said inverted conical intermediate section by means of said passage conduits tubes, in which said vapor phase-liquid phase admixture is heated by the passage over said conduits of a hot gaseous stream entered to said lower section by means of said hot gaseous inlet means, and wherein said liquid is separated from said vapor by the force of said impeller being turned by a movement means to form a liquid phase against the inverted conical walls of said intermediate section and allow said liquid phase to egress from said intermediate zone through said liquid outlet means and allow said vapor phase to rise above said formed liquid conical phase and egress from said vessel through said vapor outlet means in said upper section of said apparatus.

A specific method of this invention resides in a method of separating a vapor phase from a liquid phase in an admixture containing both said phases which comprises: passing said admixture through a plurality of tubes in indirect heat exchange with steam; discharging said heated admixture to a separation zone containing an impeller; rotating said impeller to effect a liquid phase maintained by a centrifugal force acting thereon and to permit the evolution of said vaporous phase from said liquid phase; and discharging and recovering said liquid and vaporous phases through different outlet means.

BRIEF DESCRIPTION OF THE INVENTION

The invention may be more clearly understood by reference to the accompanying drawings thereof, wherein.

DETAILED DESCRIPTION OF THE DRAWING

Figure 1:
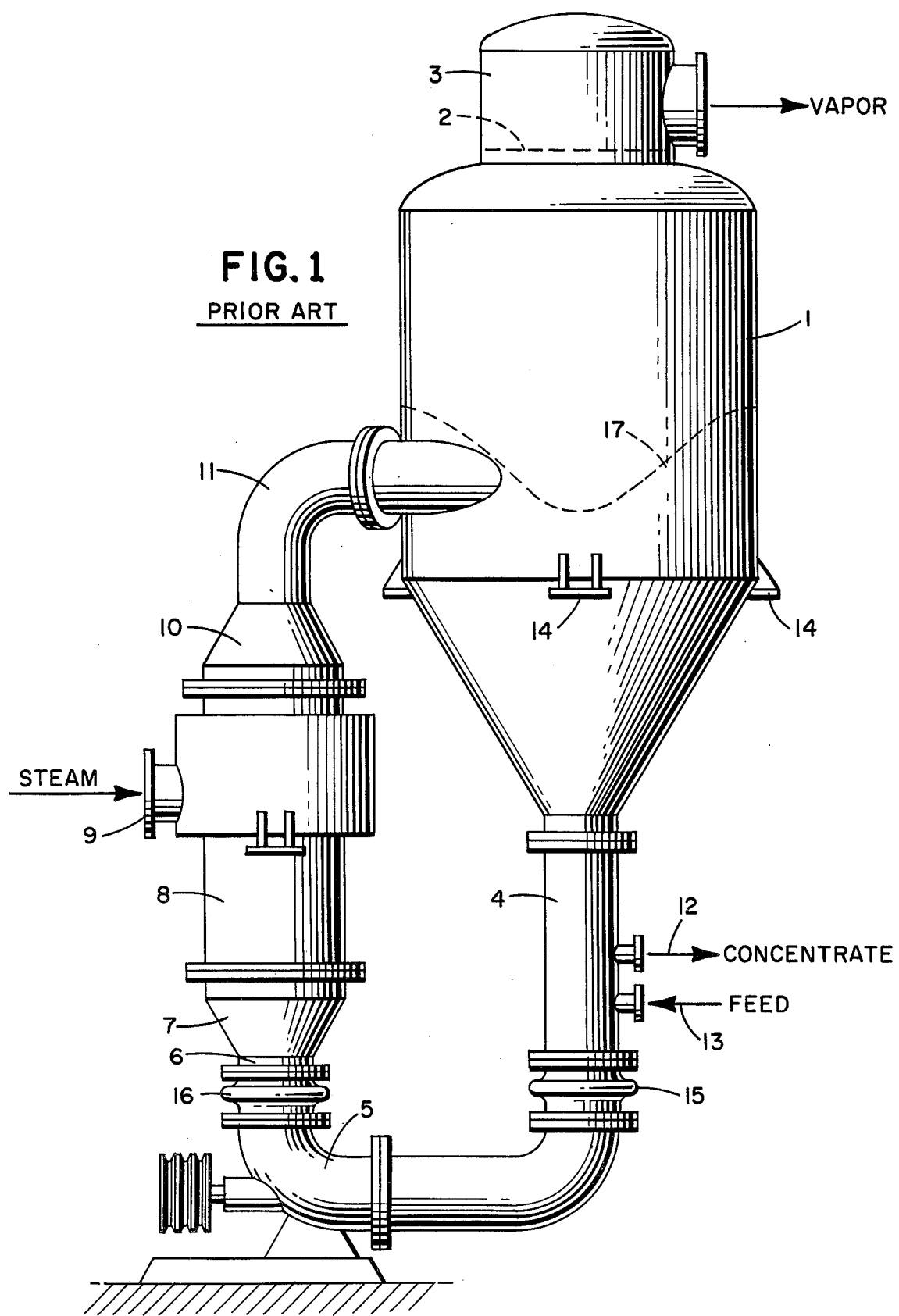
FIG. 1 is an elevation view of the most common type of modern forced-circulation evaporator now in use and therefore labeled prior art.

In FIG. 1, vapor body or flash chamber 1 of the conventional forced-circulation evaporator is used for vapor-liquid separation. It must be large enough in diameter to achieve a rising velocity of evolved vapor lower than the settling rate of the majority of liquid droplets entrained in the vapor as a result of flashing of the liquid entering the body. It must also be quite high to prevent splashes from being thrown directly into the vapor outlet. It is not usually feasible to make the diameter large enough to separate the finer entrained droplets and these are removed by a supplementary separator such as knit mesh 2, contained in monitor 3 at the top of the vapor body. Liquid after flashing is withdrawn through line 4 by pump 5, which for the large evaporative capacities is usually a large volume, low head propeller pump. Liquid discharged from the pump is conveyed by line 6 to inlet cone 7 of shell-and-tube heat exchanger 8, where heat is imparted to the liquid, usually by steam entering via line 9. Not shown are the usual connections for removing condensate of the steam and for venting of non-condensibles from the heat exchanger shell. Heated liquid from the tubes is collected by the top cone 10 of the heat exchanger and delivered by line 11 back to the vapor body, where it flashes to release as latent heat of vapor the heat picked up in heat exchanger 8. The return connection 11 is usually introduced into vapor body 1 tangentially, which helps throw much of the splashing liquid against the body wall and out of the path of the evolving vapor. Flows of dilute feed and concentrated discharge liquid are generally several orders of magnitude smaller than the circulating flow. Connections for feed and discharge are usually made in the circulating piping, as at 12 and 13 in FIG. 1.

Having described a modern forced-circulation evaporator of conventional design, I will list the disadvantages that my invention eliminates or alleviates;

1. Vapor body 1 must be relatively high and large in diameter and must be elevated an appreciable distance above pump 5 to provide the net positive suction head needed for proper working of the pump.
2. Vapor body 1 is generally supported at the higher elevation by brackets 14, from supporting structures not shown. To accommodate differential expansion between the supporting structure and the hot piping, an expansion joint 15 is needed. (Alternatively the pump and its drive may be mounted on a spring-supported base.)
3. Similarly, an expansion joint 16 is needed at the pump discharge to accommodate differential expansion between heater 8 and pump 5.
4. Total head on circulating pump 5, and hence power consumption, is quite high. Not only must friction losses be overcome in the tubes and circulating piping but also there are head losses due to acceleration from vapor body 1 to suction piping 4, expansion from pump discharge line 6 to lower heating cone 7, contraction at the inlet to the heat transfer tubing, expansion at the tubing outlets, contraction from top cone 10 into discharge line 11, and expansion from line 11 into vapor body 1. In addition, there is usually a substantial head loss in vapor body 1 due to vortex action, which causes a "whirlpool" type liquid surface 17, with a lower level at the vessel center line, where pump suction line 4 is connected, than at the vessel walls, where discharge line 11 is connected.
5. Without additional thermal or mechanical devices in vapor body 1, foaming is difficult to suppress and the evaporator is not well suited to evaporation of foaming feeds.

Figure 2:
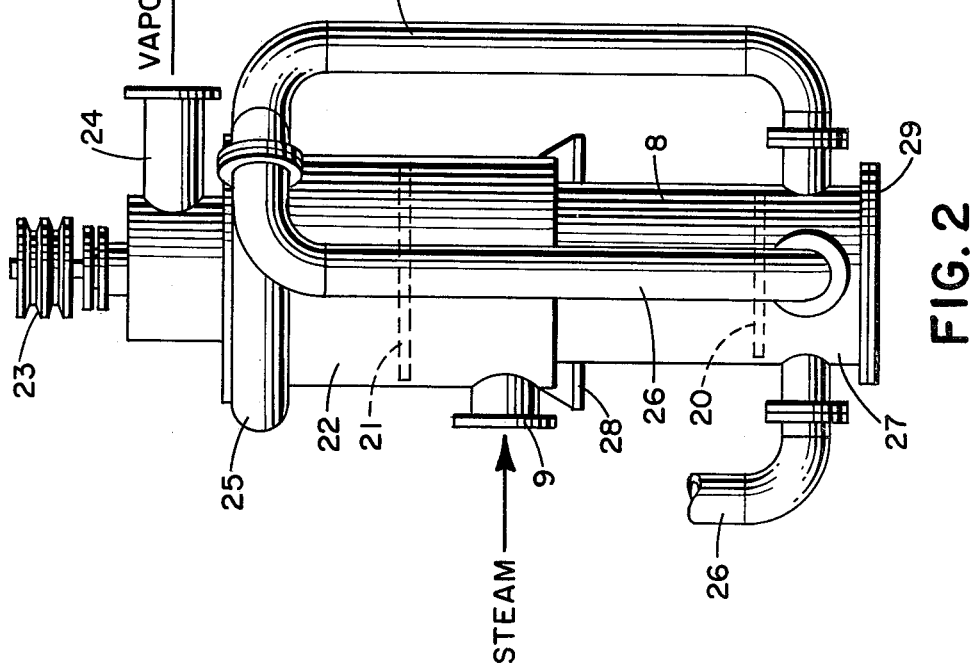
FIG. 2 is an elevation view of a forced-circulation evaporator for the same capacity and drawn to approximately the same scale as FIG. 1 but using my combination pump/vapor-liquid separator.

FIG. 2 shows how my invention reduces the size of a forced-circulation evaporator, being drawn on approximately the same scale as FIG. 1, for the same evaporative duty. Heater section 8 is essentially the same as in FIG. 1 and is provided with a similar steam inlet 9 and the usual condensate and vent connections, not shown. The heat transfer tubing is contained between lower tubesheet 20 and upper tubesheet 21. The space 22 above upper tubesheet 21 is occupied by my combination pump/vapor-liquid separator, the impeller of which is driven by pulley 23 or any other suitable drive devices, using a motor or turbine that is not shown. Vapor discharges by line 24 while circulating liquid is collected by volute 25 and recirculated by line or lines 26 to chamber 27 below the inlet to the heat transfer tubes. As a circulating pump, my device needs no net positive suction head, so the entire evaporator can be located as near grade level as desired. The only reason for providing any support brackets 28 above grade level is for those cases where easy access to the inlet ends of the tubes is desired, as by removal of lower heating element flange 29. Since the entire evaporator is supported at one level, there is no need for expansion joints in the circulating piping as there is in the conventional type of FIG. 1.

Figure 3:
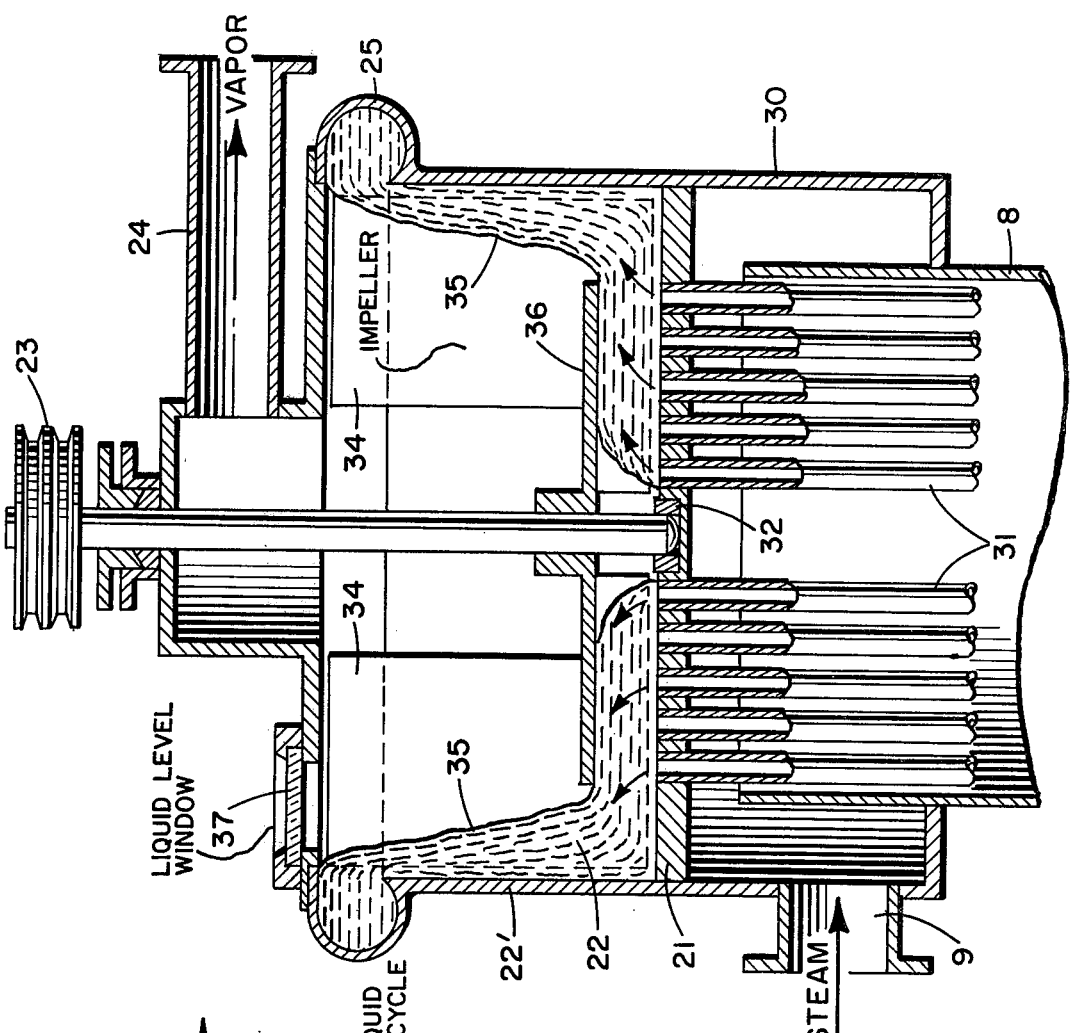
FIG. 3 is a partial vertical section of the evaporator of FIG. 2, taken through the vertical centerline of same.

FIG. 3 is an enlarged cross section of the upper part of the evaporator of FIG. 2 showing details of a preferred embodiment of my invention. It is common practice to provide an enlarged section 30 around the upper end of heating element 8 to help distribute steam from inlet 9 around the entire perimeter of the top ends of the bundle of tubes 31. It is convenient to extend this enlarged section to form shell 22' of my pump/vapor-liquid separator, although a greater or smaller diameter shell 22' may in some cases be more practical. Heat transfer tubes 31 are rolled or otherwise sealed into upper tubesheet 21 as is usually done, and discharge into space 22. This tubesheet 21 also contains, or has mounted thereon near its center, bearing 32 for shaft 33 that drives the impeller 34. Impeller 34 is rotated at sufficient speed to throw the liquid or liquid-vapor mixture issuing from tubes 31 against the outer wall 22' of the chamber and to form a liquid ring 35 thereon. This ring will have a conical inner surface, the slope depending on the ratio of gravitational to centrifugal forces, the latter being governed by the speed and diameter of the impeller 34. Liquid flows up the wall 22' and is collected by diffuser ring or volute 25 for recycle to the tubes by line or lines 26 of FIG. 2. The volute may be designed according to the same general principles now used for centrifugal pumps. Vapor issuing from the tubes and that formed by flashing of the liquid leaving the tubes flows toward the axis of the impeller and out line 24 for whatever use is desired. This may be condensation in a condensor, condensation in another similar or a conventional evaporator effect of a multiple effect evaporator, or to a compressor for reintroduction in steam inlet 9 in thermocompression operation. Impeller blades 34 are connected to shaft 33 by plate 36, said plate being approximately the same diameter as the bundle of tubes 31 so that liquid and vapor from the tubes cannot escape directly toward the vapor outlet 24 without being subjected to the centrifugal flow induced by blades 34. Thus entrainment of liquid in the vapor is prevented primarily by the high centrifugal forces imposed on entrained droplets, causing them to settle at velocities appreciably greater than possible when the droplets are subject only to normal gravitational forces. I have found that this use of an impeller for vapor-liquid separation is also quite effective in the concentration of foaming solutions, permitting my evaporator to work with liquids that would be impossible to concentrate in a conventional forced-circulation evaporator.

It can be seen that the only liquid in my flash chamber is the relatively thin liquid ring 35, which is very much smaller in volume than the liquid contents of a conventional flash chamber. This is of decided advantage for evaporating heat sensitive materials since holdup time in the evaporator is effectively minimized. The "level" in my evaporator is the depth of the liquid ring 35 and this depth would normally be used as the signal for controlling rate of feed or of concentrate withdrawal. This depth can be observed by a window such as shown at 37 but normal procedure would be to use conventional automatic control practice to regulate the level.

Figure 4:
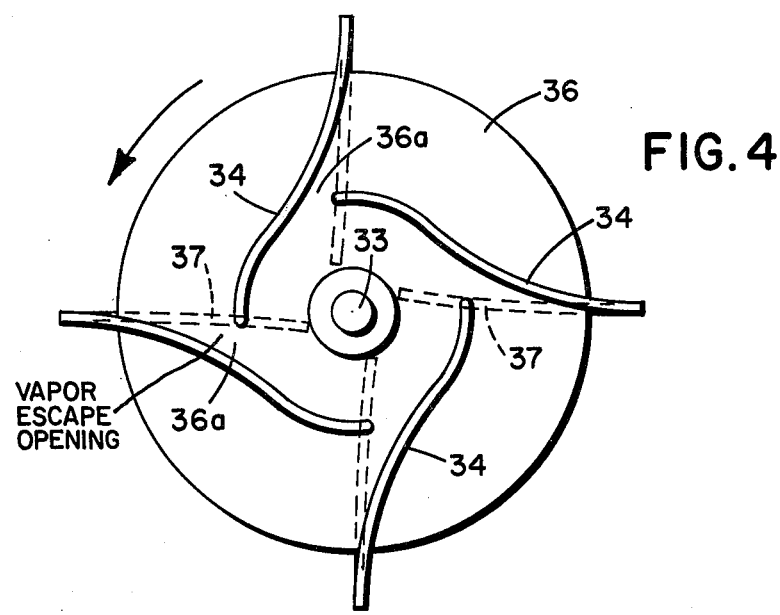
FIG. 4 is a plan view of the type of impeller used in the evaporator in FIG. 2.

FIG. 4 is a top view of a preferred configuration of the rotating impeller of FIG. 3. Rotation of the assembly is in the direction shown by the arrow and is accomplished by shaft 33 to which plate 36 is attached, the blades 34 themselves also being attached to plate 36. That portion of the blades above plate 36 is shaped to leave central vapor escape opening 36a and to cause the vapor to accelerate in the direction of rotation in order to escape between blades. This shape aids further in separation of entrained droplets. Below plate 36, the blades are continued to close proximity to shaft 33, as shown by dashed lines 37, to aid in sweeping the liquid or liquid-vapor mixture leaving the heat transfer tubes 31 toward outer wall 22.

Figure 5:
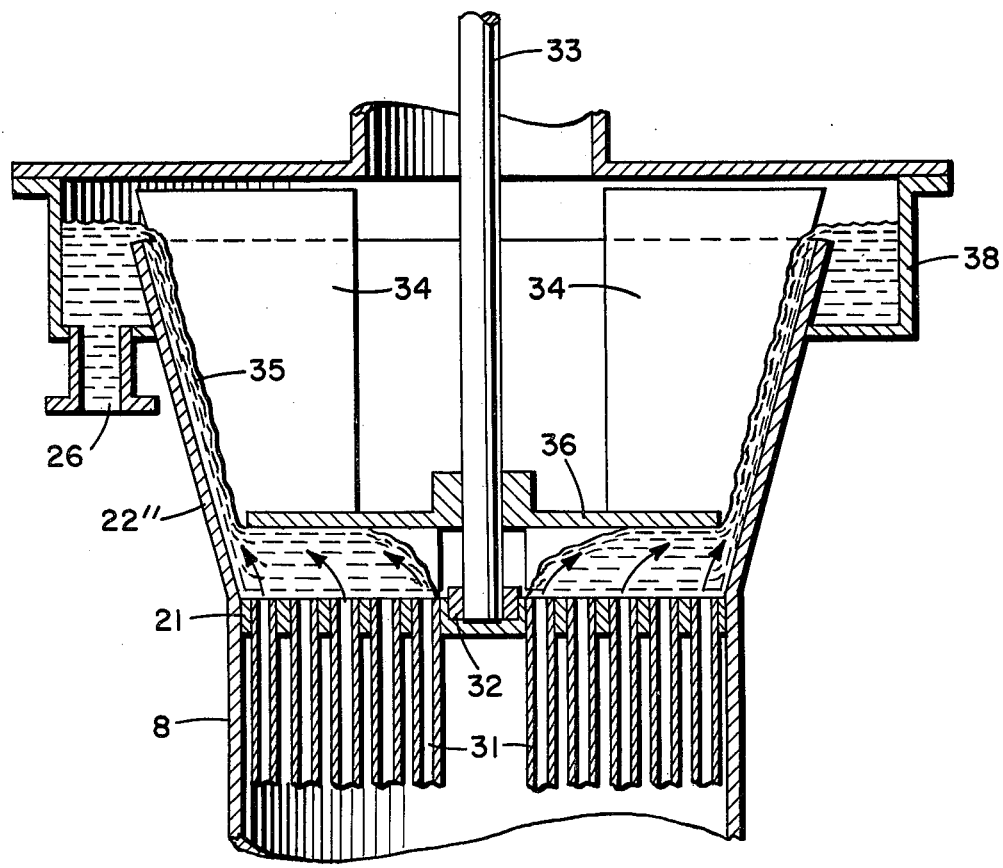
FIG. 5 is an alternate partial vertical section of the evaporator in FIG. 2.

FIG. 5 is an alternate version of my evaporator and is a section through the top end of the evaporator similar to the section in FIG. 3. In any such evaporator, it is necessary to provide a certain amount of free liquid surface from which vapor can escape, both to minimize entrainment and to provide time for the liquid to flash to the pressure existing in the vapor space. This surface is the product of the inner circumference of liquid ring 35 and the height of the ring. In many cases, the height of this ring can conveniently be as great as the head loss of liquid, due to friction and acceleration and expansion losses, circulating through the system. In such cases, a simple overflow at the top of the impeller chamber, into collector launder 38, will be sufficient to provide the head needed to circulate the liquid at the desired rate, the liquid being recirculated by gravity flow through line or lines 26. Further, regardless of which type of collector is used at the top, it may many times be desirable to taper the outer wall of the pump/vapor-liquid separator chamber, as shown by 22 in FIG. 5. This not only conserves metal but also results in a lesser liquid depth at the bottom of the ring and thereby promotes more complete flashing of the liquid. The reasoning here is that the centrifugal forces on the liquid cause the pressure to increase more rapidly with depth than when under normal gravity and the higher pressure in the deep part of the lower section of the ring, when the outer wall is cylindrical, may be sufficient to prevent the liquid from flashing.

Figure 6:
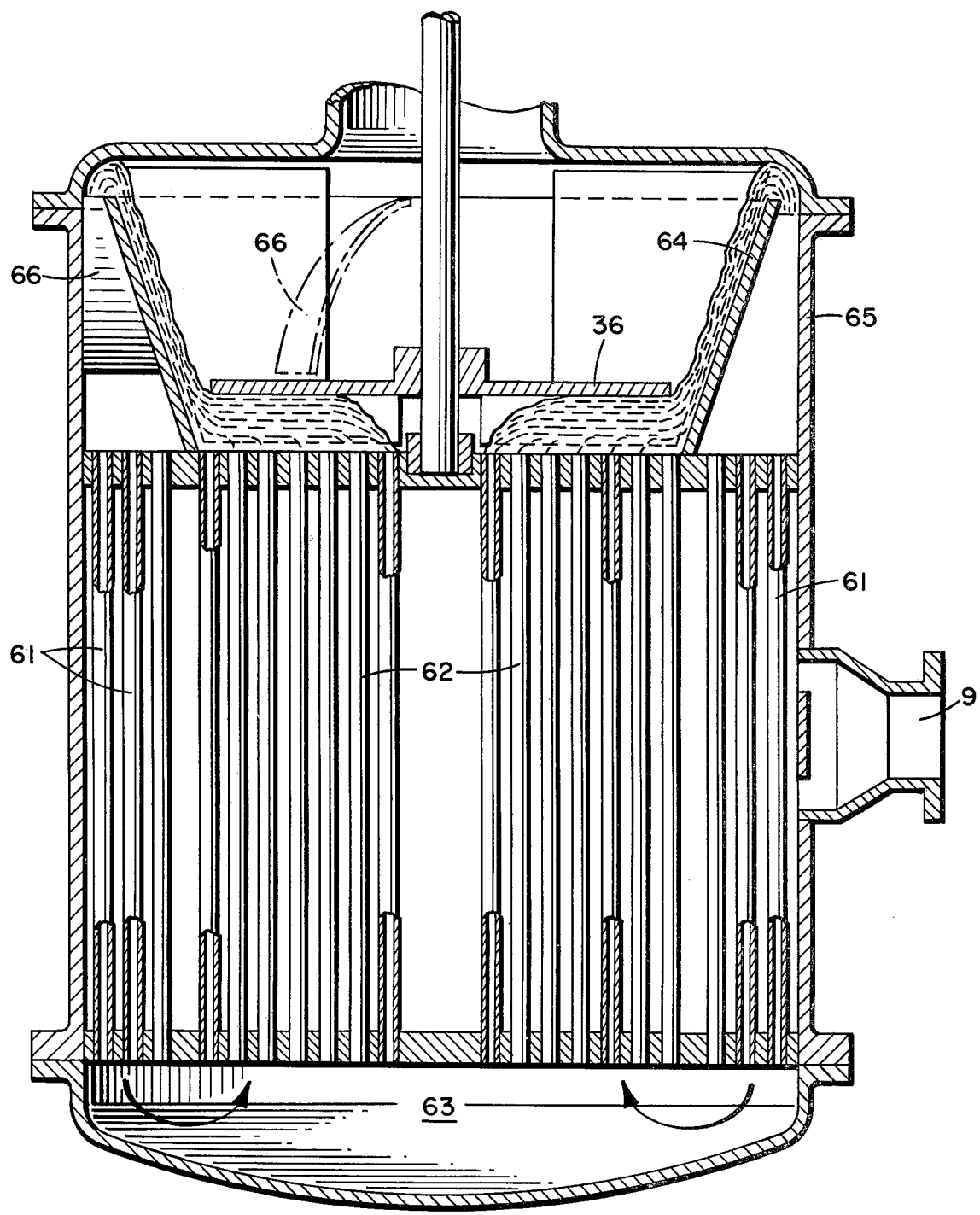
FIG. 6 is an alternate vertical cross-section similar to FIG. 3 except arranged for two-pass flow through the heat transfer tubes.

FIG. 6 shows another variant of my evaporator in which the flow through the heat transfer tubes is in two passes. This appreciably shortens the tube length required and further reduces the total height of the evaporator. It also eliminates need for the recirculating line or lines 26 of FIG. 2. In this type, the outer tubes 61, comprising about half the total number of tubes, operate downflow, taking their feed directly from the discharge of my pump/vapor-liquid separator. The effluent from these tubes then passes up the inner half of the tubes 62 in the central part of the bundle, by way of lower waterbox 63. These latter tubes 62 then discharge into the rotating impeller section as before. Conical or cylindrical baffle 64 then forms the outer wall of my impeller housing and the space between this baffle 64 and outer shell 65 serves as the conduit for feeding the downflow tubes 61. Diffuser vanes 66 may be added in this conduit to convert the rotary motion of the liquid created by the impeller into additonal pressure head.

Figure 7:
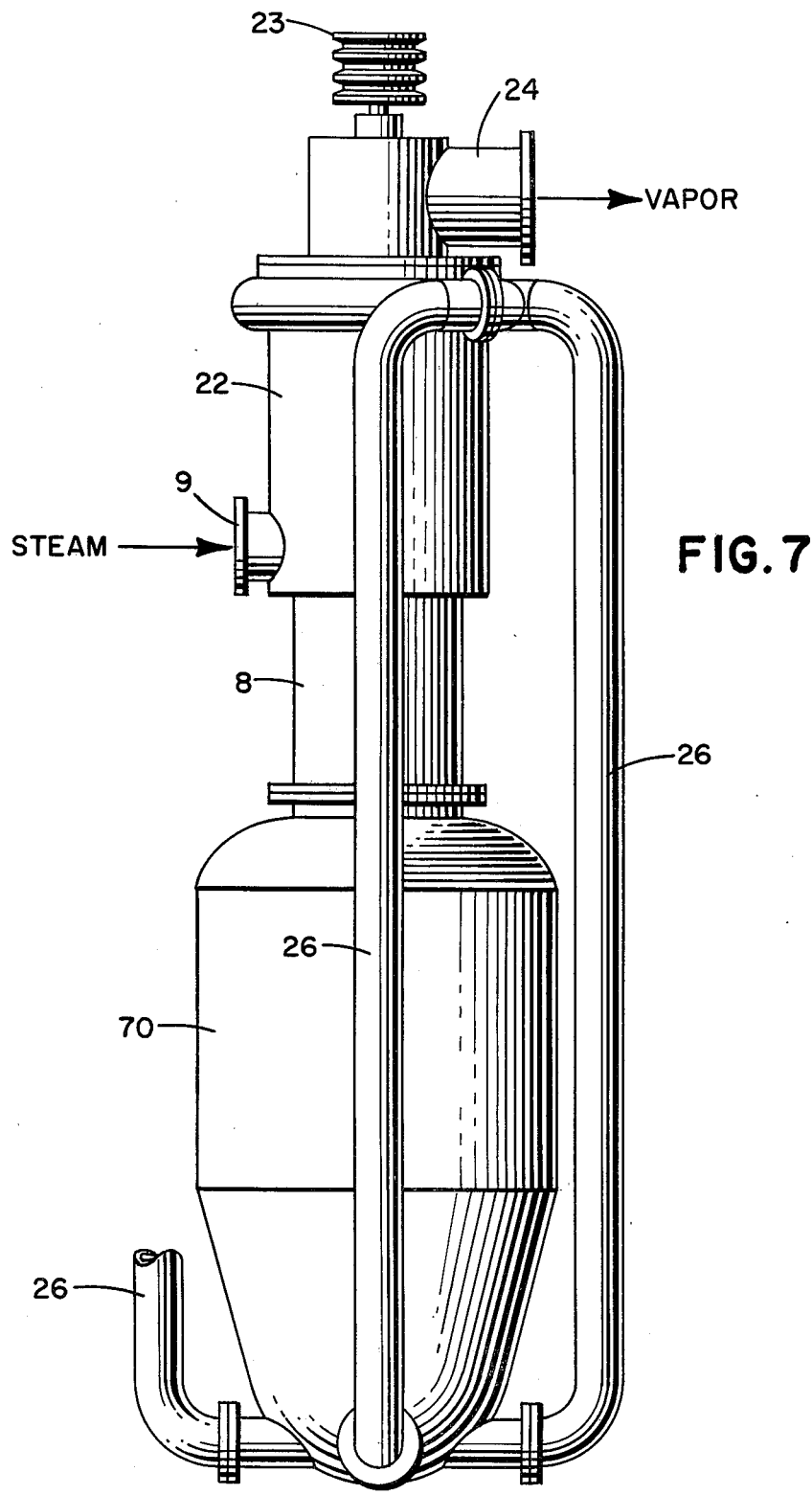
FIG. 7 shows the use of my pump/vapor-liquid separator in a forced circulation evaporator intended for crystallizer service.

A forced circulation evaporator such as shown in FIG. 2 would not usually be suitable for crystallizing service because the holdup time in the evaporator would be too short to grow crystals of acceptable size. FIG. 7 shows a modification of my invention intended to overcome this difficulty. Here, a crystal retention chamber 70 is added below heating element 8 to provide retention time for crystal growth. By suitable proportioning of diameter and length of chamber 70, the evaporator could be operated either with a suspended bed of crystals in chamber 70 (Oslo type operation), or as a circulating magma crystallizer, wherein crystals circulate through the entire system. For either type, heater 8 could be of the single pass type, as shown, or of the multiple pass type shown in FIG. 6. The conventional forced-circulation evaporator of FIG. 1 suffers from two additional difficulties when used in crystallizing service. One is that the propeller pump usually operates at a blade tip speed of 75 to 100 ft./sec., whereas mine would normally operate at only about 15 to 25 ft./sec., thereby reducing abrasive wear from the crystals and causing less crystal breakage. The other is that salt deposits or "coaming" tends to build up on the walls of vessel 1 near the liquid level and in the splash zone, due to the high supersaturation generated when liquid flashes as it enters the vessel. In mine, on the other hand, splashing is minimized and the flash vessel walls are swept by the impeller, thereby preventing substantial crystal buildup.

Figure 8:
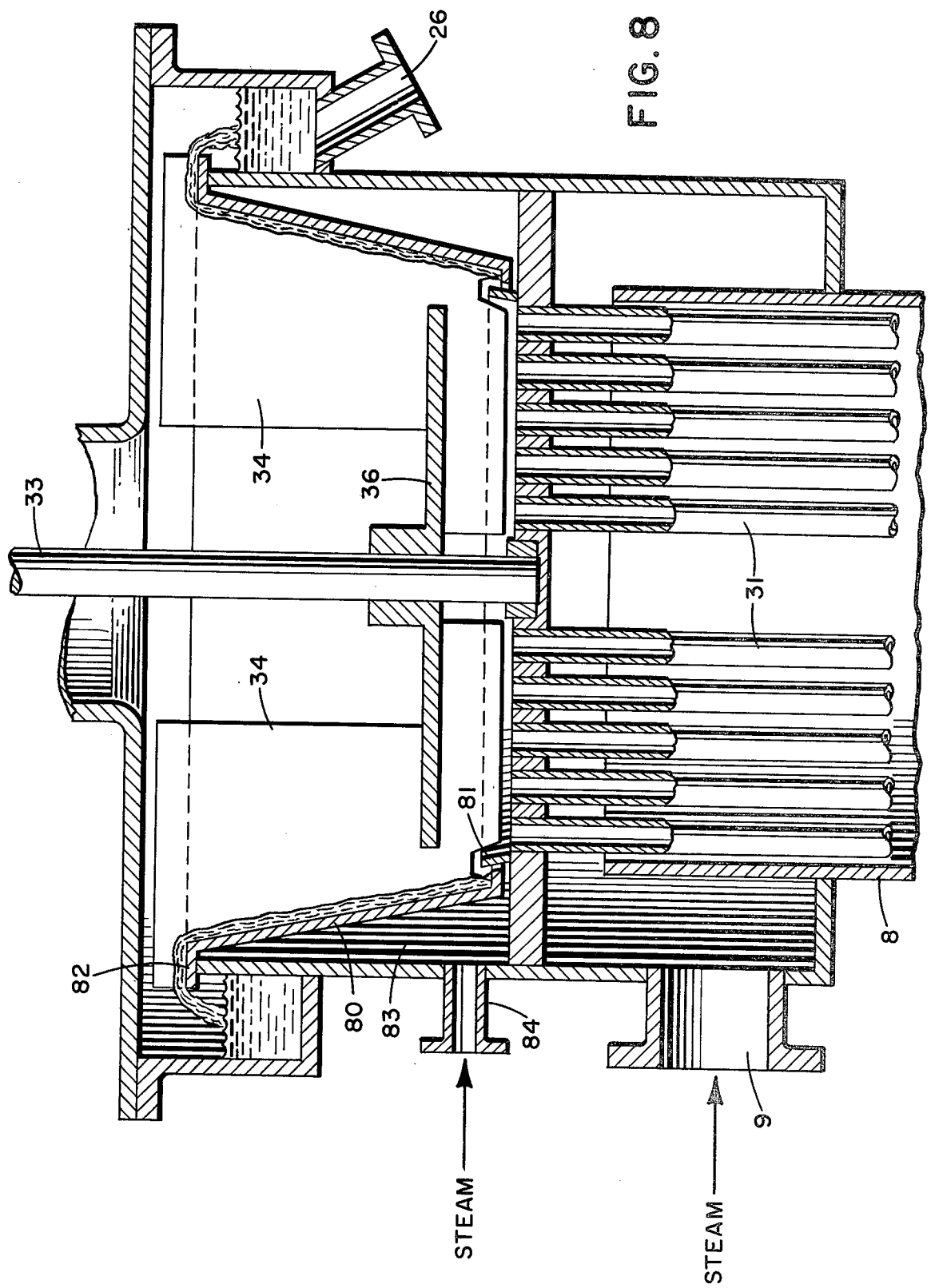
FIG. 8 is an alternate version of my pump/vapor-liquid separator intended primarily for use with extremely viscous liquid.

FIG. 8 shows another version of my pump/vapor-liquid separator designed for use with highly viscous liquids or liquids containing crystals that are highly abrasive or easily broken. In this version, the outer wall 80 of the pump/vapor-liquid separator is attached to, and rotates with, impeller blades 34. This wall may be either conical, as shown, or cylindrical. The purpose here is to avoid the high velocities of liquid past the wall, the only velocity in this case being the flow upward toward liquid recycle outlet 26. By suitable arrangement of lower dam 81 and top flange 82, as suggested in FIG. 8, liquid penetration into space 83 can be avoided, thereby avoiding drag from the viscous liquid on the outer side of wall 80. As a further means of preventing access of liquid into this zone, especially during startup or shutdown, steam can be admitted to this zone via connection 84, at a pressure slightly higher than the pressure in the flashing zone.

Figure 9:
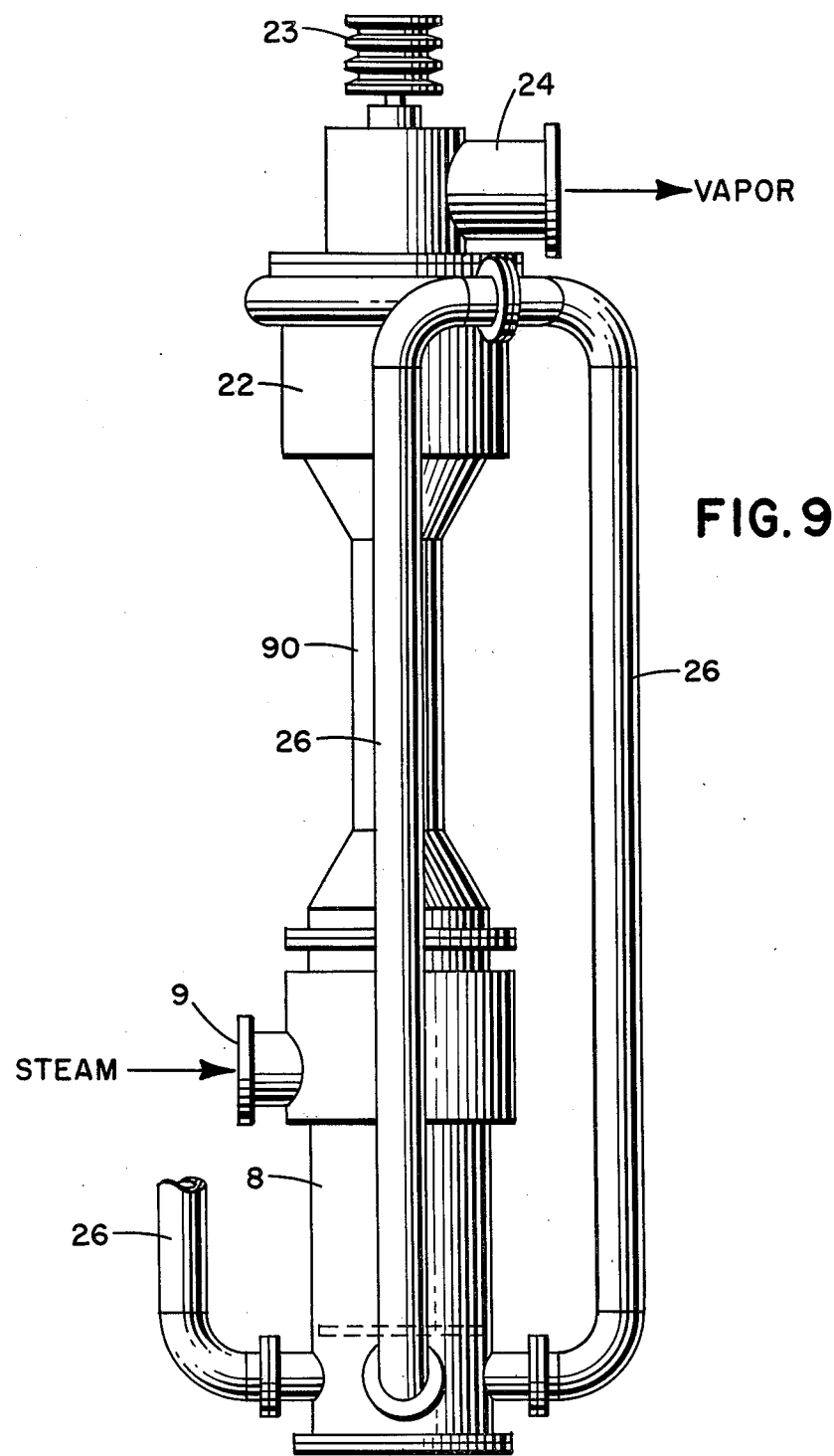
FIG. 9 is an alternative version of my invention intended to prevent boiling of the liquid in contact with the heating surfaces of the evaporator.

It is, of course, not necessary that my combination pump/vapor-liquid separator be located directly above the outlet of the heating element tubes as shown in FIGS. 2, 3, 5, 6, 7, and 8. In some forced circulation applications, it is desireable that no boiling occur in the heating element tubes. Such is the case when boiling may cause salts or scale to deposit on the tube walls, thereby hindering heat transfer. Boiling is prevented in the conventional evaporator in FIG. 1 by locating heating element 8 an appreciable distance below liquid level 17 in vapor body 1. Hydrostatic head thus raises the pressure and hence boiling point in the tubes above the actual liquid temperature in the tubes. The same can be accomplished when using my invention by providing a riser pipe between heating element and pump/separator, as shown in FIG. 9. Here, heater 8 and pump/vapor-liquid separator 22 are separated by riser 90 of sufficient length to raise the pressure in the heat transfer tubes above the vapor pressure of the heated liquid at the tube outlets. It is obvious that heater 8 in FIG. 9 could alternatively be arranged with the tubes horizontal in order to reduce headroom requirements.

Figure 10:
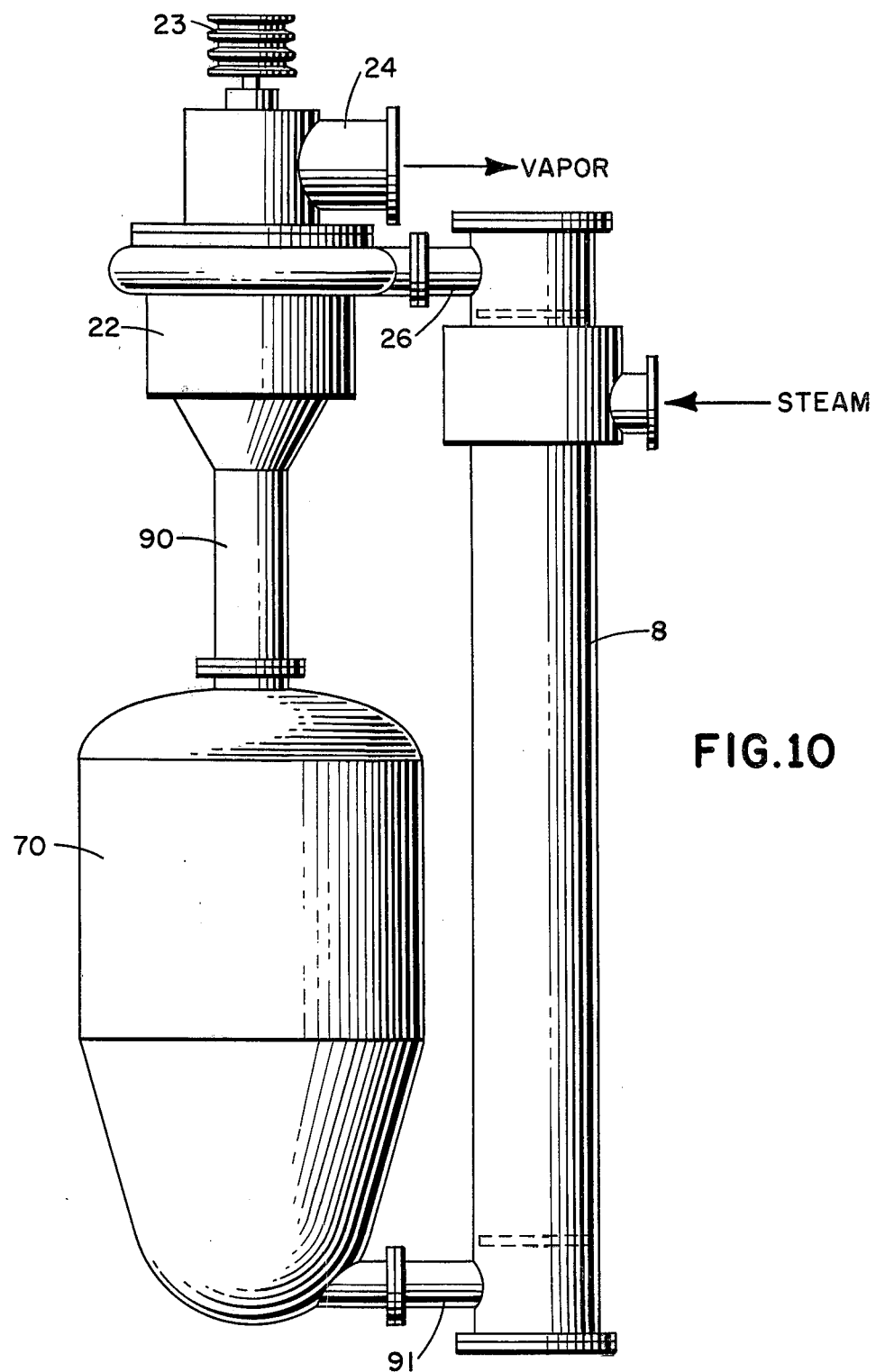
FIG. 10 is an alternate flow sequence for a crystallizing evaporator using my invention and designed to reduce the risk of scale formation on the heating surfaces.

Similarly, in crystallizing service it is not always desireable that vapor release occur after heating and before entering the holdup or contact vessel, as shown in FIG. 7. Thus when handling a scaling liquid (one in which the solubility of the scaling ingredient decreases with an increase in temperature), it would be desireable that the sequence be flash—heat—seed contact—flash—heat . . . In this way, the practically saturated solution after seed contact becomes unsaturated on cooling from vapor release and thus is unsaturated on entering the heating element, thereby reducing the risk of scale deposition on the tubes. FIG. 10 shows one means of using my combination pump/separator in this manner. Here, my pump/separator 22 is mounted above contact vessel 70 and either mounted directly thereon or connected thereto by means riser pipe 90, as shown, to prevent boiling in vessel 70. Discharge line or lines 26 then convey the flashed liquid (or slurry) to heater 8, which in turn discharges heated liquid via line 91 back to the contact vessel 70. It is to be understood that contact vessel 70 may be sized either to retain part or most of the precipitating solids or to allow them to circulate through the system with the liquid.

While the invention has been described in conjunction with vertical tubes as the heating surface, I do not intend to be limited by such configuration. Such an evaporator can work equally well with plate type or other heating elements and also need not be arranged vertically. Even a horizontal configuration is practical when a riser pipe is used between the heating element and pump/separator or when the heating element diameter is small relative to the head losses of liquid circulating through the system (i.e., so that the lowermost tubes do not take all the circulating flow). Further, although I show a desirable impeller configuration in FIG. 4, simplifications and refinements in impeller shape are within the intended scope. Thus simple radial blades extending all the way to the shaft will provide acceptable performance for many operating conditions. Further refinements in impeller shape are obvious, such as shaping the underside of plate 36 to provide a constant velocity or a velocity gradient for the liquid or liquid-vapor mixture collected from the tube exits, and/or the curving of blades 34 to help lift the liquid ring along the wall toward the recirculating outlet.

Although the present invention has been described in conjunction with preferred embodiments, it is to be understood that modifications and variations may be resorted to without departing from the spirit and scope of the invention, as those skilled in the art will readily understand. Such modifications are considered to be within the purview and scope of the invention and the appended claims.

I claim as my invention:

1. A forced circulation evaporator apparatus for removing as vapor part of a liquid contained in a feed stream charged to said apparatus which comprises:
   (a) an elongated vessel having a stationary upper, imperforate intermediate and lower portion thereof possessing (i) a vapor outlet in said upper portion; (ii) a liquid outlet in said intermediate portion; and (iii) a hot gaseous inlet and a liquid phase feed inlet in said lower portion;
   (b) a stationary plurality of heat transfer passage conduits situated in said lower portion of said vessel and substantially parallel to the longitudinal axis of said vessel wherein said plurality of heat transfer conduits initiate in the lower portion of said vessel and terminate in the intermediate portion of said vessel for passage of a vapor phase-liquid phase admixture therethrough, said admixture being heated by indirect heat exchange with a hot gaseous stream entered in said hot gaseous inlet situated in said lower portion of said vessel;
   (c) an impeller situated within said intermediate portion of said vessel, said impeller possessing a shaft situated substantially parallel to said plurality of heat transfer passage conduits, a plate situated above the point at which said heat passageway conduits terminate and at least one blade attached to either or both of said shaft and plate; and
   (d) a movement means for turning said impeller to form a conical-shaped liquid phase along the interior of the walls of said intermediate portion of said vessel to effect discharge of said liquid phase through said outlet opening in the uppermost portion of said intermediate zone, said outlet opening being situated above said impeller blade and plate and wherein said impeller movement causes said vapor in said vapor phase-liquid phase admixture to rise above the surface of said liquid phase and exit said forced circulation evaporator apparatus through said vapor outlet situated in said upper portion of said vessel.

2. A vapor-liquid separating apparatus for removing as vapor part of a liquid contained in a feed stream charged to said apparatus which comprises a stationary elongated vessel having an upper section containing a vapor phase outlet means, a stationary imperforate inverted conical intermediate section containing a liquid outlet means and an impeller means and a stationary lower section containing a liquid phase inlet means, a stationary hot gaseous inlet means and a plurality of vapor heat transfer passage conduits, wherein said conduits initiate in said lower section and terminate in said inverted conical intermediate section below said impeller and wherein both said impeller and the said plurality of heat transfer passage conduit tubes are disposed substantially parallel to the longitudinal axis of said elongated vessel, wherein a vapor phase-liquid phase admixture is passed from said lower section to said inverted conical intermediate section by means of said heat transfer passage conduits tubes in which said vapor phase-liquid phase admixture is heated by the passage over said conduits of a hot gaseous stream entered to said lower section by means of said hot gaseous inlet means, and wherein said liquid is separated from said vapor by the force of said impeller being turned by a movement means to form a liquid phase against the inverted conical walls of said intermediate section and allow said liquid phase to egress from said intermediate zone through said liquid outlet means and allow said vapor phase to rise above said formed liquid conical phase and egress from said vessel through said vapor outlet means in said upper section of said apparatus.

3. The apparatus of claims 1 or 2 wherein said liquid outlet means possesses a recyle conduit attached to said lower section of said vessel and wherein said recycle conduit has an outlet means to remove said separated liquid from said conduit.

4. That apparatus of claim 2 wherein said impeller comprises a rotatable shaft, a base plate at the extremity thereof and a blade attached to said shaft or plate or both said shaft and plate.

5. That apparatus of claims 1 or 2 wherein said intermediate section has liquid retaining interior side walls attached to the shaft of said impeller to turn said side walls at a rate of speed equal to that of said impeller's blades.

6. A forced circulation evaporator apparatus for removing as vapor part of a liquid contained in a feed stream charged to said apparatus which comprises:
   (a) an elongated vessel having a stationary upper, imperforate intermediate, riser and lower portion thereof possessing (i) a stationary vapor outlet in said upper portion; (ii) a liquid outlet in said imperforate intermediate portion; (iii) a stationary hot gaseous inlet and a liquid phase feed inlet in said lower portion; and (iv) a riser portion wherein said riser portion interconnects said lower portion and said intermediate portion;
   (b) a stationary plurality of heat transfer conduits situated in said lower portion of said vessel for passage of a liquid phase therethrough, said admixture being heated by indirect heat exchange with a hot gaseous stream entered in said hot gaseous inlet situated in said lower portion of said vessel;

(c) passageway through said riser portion for direct passage of said liquid phase from said lower portion to said intermediate portion allowing it to partially flash to vapor; and (d) an impeller situated within said intermediate portion of the vessel, said impeller possessing a shaft situated substantially parallel to said riser portion and a movement means wherein said liquid is separated from said vapor by the force of said impeller being turned by said impeller means to form a liquid phase against the walls of said intermediate section and allow said liquid to egress from said intermediate zone through said liquid outlet means and allow said vapor to rise above said formed liquid phase and egress from said vessel through said vapor outlet in said upper portion of said vessel.

7. A vapor-liquid separating apparatus for removing as vapor part of a liquid contained in a feed stream charged to said apparatus which comprises:

(a) a stationary upper portion having a vapor outlet disposed therein;

(b) a stationary intermediate portion having a liquid outlet in said upper section of said intermediate portion, wherein said liquid outlet is in interconnection with a liquid inlet of a lower portion of said vessel by means of a recycle conduit;

(c) a stationary riser portion interconnecting said intermediate portion and a lower portion;

(d) a stationary lower portion comprising said vapor-liquid inlet in interconnection with said liquid recycle conduit and said riser portion having means for passage of a vapor-liquid stream;

(e) a recycle conduit having a gaseous inlet means for passage of a hot gaseous inlet stream to indirectly heat said liquid in said liquid recycle conduit; and (f) an impeller situated within said intermediate portion of said vessel, said impeller possessing a shaft situated substantially parallel to said riser portion and a movement means wherein said liquid is separated from said vapor by the force of said impeller being turned by said impeller means to form a liquid phase against the walls of said intermediate portion and force said liquid to egress from said intermediate zone through said liquid outlet in said intermediate portion's upper section and allow said vapor to rise above said formed liquid phase and egress from said vessel through said vapor outlet in said upper portion of said vessel.

8. The forced circulation evaporator apparatus of claim 6 wherein said liquid inlet in said lower portion is in interconnection with said liquid outlet in said intermediate portion.

* * * * *